Patented Aug. 15, 1939

2,169,814

UNITED STATES PATENT OFFICE 2,169,814

BONDING AND COATING PRODUCT

Joseph C. Patrick, Trenton, N. J., assignor to Thiokol Corporation, Yardville, N. J., a corporation of Delaware No Drawing. Application March 22, 1935, Serial No. 12,449. Renewed December 24, 1938

8 Claims. (Cl. 260—2.8)

This invention relates to a thermo-plastic product that can be used for making bonds between surfaces and also for coating and other purposes, and to the process of making the product.

In carrying out this invention, a mixture or product is made comprising sulfur and reaction products of alkaline polysulfides and derivatives or compounds of olefins having the general formulae $C_nH_{2n}X_2$, and $OC_nH_{2n}X_2$ where X is a negative radical as set forth, for example, in my prior Patent No. 1,890,191, of December 6, 1932, and in my applications, Ser. No. 724,619, filed May 8, 1934, and Ser. No. 737,389, filed July 28, 1934.

Heretofore attempts to make such mixtures or products of sulfur and reaction products of the sorts mentioned above, have not been entirely satisfactory because they do not possess the desired properties for many purposes.

It is well known that after sulfur has been melted and cooled it becomes brittle and will spall or crack when subjected to changing temperatures, and that after its temperature reaches a certain degree when it is melted, its viscosity increases at higher temperatures instead of decreasing.

It has also been found that when the reaction products mentioned above are mixed with sulfur and the mixture used, for example, as a cement or bond between bricks, or when such mixture is applied to surfaces as a protective coating, the mixture does not spall or crack the way sulfur does when similarly used, but difficulties have been encountered in attempts to use this mixture for these purposes because it also possesses the peculiar characteristics of sulfur in that after it passes through a critical temperature point its viscosity actually becomes greater as its temperature is raised somewhat above that of its initial melting point. This characteristic of sulfur is well known, so that in prior cements consisting principally of sulfur it constitutes a very serious handicap in the application of these substances, especially in those cases where the molten mixture must be caused to run into narrow cracks or interstices, or where the material is to be applied to surfaces by brushing, spraying or other suitable means of application. That is, the problem in applying either sulfur or a mixture of sulfur and other materials, such as the reaction products mentioned above, for example, is to reduce the viscosity of the same while in a molten state to as great an extent as possible, as increasing the temperature does not reduce the viscosity of sulfur or prior mixtures of sulfur and other materials after a certain temperature has been reached but actually increases it.

By the present invention this difficulty is overcome and the viscosity of a mixture of sulfur and the reaction products mentioned above, as well as that of sulfur itself or sulfur mixed with other materials is reduced even when heated to relatively high temperatures and the mixtures will retain a degree of fluidity when quite hot which renders application, even to complicated surfaces, easy and complete.

In carrying out this invention, a small amount of one or more of the sulfurized pitches, as, for example, sulfurized Burgundy pitch, sulfurized rosin, sulfurized turpentine, sulfurized petroleum pitches or asphalts, as well as sulfurized natural pitches and asphalts, as for example, gilsonite, is added to sulfur or a mixture of sulfur and the reaction products mentioned above. The sulfurized material, even when present in a very small quantity, produces the desirable result, namely, the lowering of viscosity of the sulfur or mixture at elevated temperatures. These materials are unique in that they do not themselves modify to any appreciable extent the other characteristics of the sulfur or sulfur mixture when used in quantities sufficiently large to produce the desired result. The amount of sulfurized product that is to be added may be very small. As little as 1/10th of 1% by weight has a perceptibly beneficial action and quantities of the order of one-half per cent to one and one-half per cent, or more, have a very pronounced effect in this respect. The range, say from about ½% to about 1½%, has thus far been found to be the preferable range for most purposes, although the particular purpose for which the resulting product is to be used should be taken into consideration in determining the most desirable proportions. They can be ascertained by making a few tests. Percentages above 50% could be used for certain purposes with advantageous results. From an economic standpoint, another very great advantage of using the sulfurized compounds of the sort described is their cheapness and the ease with which they may be prepared.

Solely by way of illustration, I will explain a method by which the one of these sulfurized products may be prepared which is typical of them all. For example, five pounds of Burgundy pitch are treated with seven pounds of sulfur, together with a very small amount of a substance which presumably acts catalytically, such as, for example, one ounce of potassium carbonate, or an equal amount of one of the alkali sulfides, such as sodium or potassium sulfide may be used. The pitch, sulfur, and catalyst are simply mixed together and heated to, say 150 to 160° C. and held at that temperature until most of the evolution of gas has ceased. This usually requires from 3 to 5 hours. The final product after cooling is a brittle, resinous material having a somewhat disagreeable odor of hydrogen sulfide and when prepared as described above usually contains from about 30% to about 75% of sulfur, most of which is believed to be in chemical combination. During the heating hydrogen sulfide is evolved and there is believed to be a very considerable amount of substitution of sulfur for hydrogen in the resin molecules, the hydrogen which has been substituted combining with the excess sulfur to be eliminated as hydrogen sulfide gas. There also appears to be a very complete saturation of all double bonds in the resin acids, and the products are less soluble in ordinary resin solvents than they were previous to the reaction.

It has also been found that these sulfurized products have a softening effect upon the plastic itself when it consists of the reaction products mentioned above, such as the reaction products of alkaline polysulfides and compounds of the formulae $C_nH_{2n}X_2$, and $OC_nH_{2n}X_2$, for example.

Another great advantage of these sulfur mixtures or sulfur and plastic mixtures which have had their viscosity improved by the addition of these sulfurized products, is that very large amounts of certain desirable fillers can be added and the mixtures will still retain a sufficient degree of fluidity to make them applicable to surfaces by spraying, brushing, etc., and they are effective in filling cracks, etc. Among these fillers may be mentioned a large variety of inorganic substances, such as, for example, barium sulfate, clays, and silicious fillers or fibrous materials, such as asbestos fibre, coloring pigments, metal particles, etc. Also, a wide range of organic substances can be incorporated to make these compounds or mixtures more suitable for special uses. Among these may be mentioned sawdust, cork dust, granulated cork, wood fibre or wood flour, carbon, particles of synthetic resin and organic fibres, such as textile fibres, cloth, etc.

Among the uses to which products described herein may be put, may be mentioned cements or connecting material for bricks that are to be used in lining tanks or in walls that are not subject to high heat, such as acid pickling tanks, the linings and joints for sewers, especially sewers which have to convey waste from chemical plants, mines, etc., where serious acid corrosion may take place. The product of this invention may also, for example, be used for road markers by applying it to the road bed as expansion joints in roads and walks; as a protective coating for the bottoms of ships and marine installations which are subject to sea water and especially in those cases where poisonous substances, such as arsenic oxides, sulfides, boron and mercury compound must be used to discourage or prevent the growth of marine parasites, such as barnacles, etc.; protective coating for cement structures; protective coating for woods, such as posts and poles subject to weathering and soil corrosion; as a water-proof coating for brick and other porous material; as an acid-proof coating for metallic structures, especially in conditions such as obtain around petroleum refineries; as a roofing material; and as a semi-resilient flooring material where corrosive conditions are encountered, such as, for example, in laboratories, chemical plants and machine shops. In many cases the resiliency which the product possesses will be of value in minimizing abrasion when the product is applied to surfaces.

The amount to which the viscosity of the mixture of sulfur and reaction products or plastic is lowered by the addition of the sulfurized products, depends upon many factors, but in all instances that have been tried there is very obviously produced a considerable decrease in the viscosity of the molten mixtures by adding the sulfurized products in the amounts mentioned above.

I claim:

1. A composition of matter comprising sulfur, a sulfurized pitch, and the reaction products of an alkaline polysulfide and additive compounds of olefins included in the general formulae $C_nH_{2n}X_2$ and $OC_nH_{2n}X_2$ where X is a negative radical, a sufficient amount of elemental sulfur being present in the composition to cause the viscosity to increase at elevated temperatures in the absence of the pitch.

2. A composition of matter comprising sulfur, a sulfurized pitch having a resin acid therein, and the reaction products of an alkaline polysulfide and additive compounds of olefins included in the general formulae $C_nH_{2n}X_2$ and $OC_nH_{2n}X_2$ where X is a negative radical, a sufficient amount of elemental sulfur being present in the composition to cause the viscosity to increase at elevated temperatures in the absence of the pitch.

3. A composition of matter comprising sulfur, about ½% to 1½% of a sulfurized pitch, and the reaction products of an alkaline polysulfide and additive compounds of olefins included in the general formulae $C_nH_{2n}X_2$ and $OC_nH_{2n}X_2$ where X is a negative radical, a sufficient amount of elemental sulfur being present in the composition to cause the viscosity to increase at elevated temperatures in the absence of the pitch.

4. A composition of matter comprising sulfur, a sulfurized pitch, and the reaction products of an alkaline polysulfide and additive compounds of olefins included in the general formulae $C_nH_{2n}X_2$ and $OC_nH_{2n}X_2$ where X is a negative radical, said composition having the property of becoming less viscous at elevated temperatures up to its decomposition temperature, a sufficient amount of elemental sulfur being present in the composition to cause the viscosity to increase at elevated temperatures in the absence of the pitch.

5. A composition of matter comprising sulfur, a sulfurized pitch, and the reaction products of an alkaline polysulfide and additive compounds of olefins having the general formula $C_nH_{2n}X_2$ where X is a negative radical, a sufficient amount of elemental sulfur being present in the composition to cause the viscosity to increase at elevated temperatures in the absence of the pitch.

6. A composition of matter comprising sulfur, a sulfurized pitch, and the reaction products of an alkaline polysulfide and additive compounds of olefins having the general formulae $OC_nH_{2n}X_2$ where X is a negative radical, a sufficient amount of elemental sulfur being present in the composition to cause the viscosity to increase at elevated temperatures in the absence of the pitch.

7. A composition of matter comprising sulfur, a sulfurized pitch, and the reaction products of an alkaline polysulfide and additive compounds of olefins having the general formulae $C_nH_{2n}X_2$ where X is a negative radical, said composition having the property of becoming less viscous at elevated temperatures up to its decomposition temperature, a sufficient amount of elemental sulfur being present in the composition to cause the viscosity to increase at elevated temperatures in the absence of the pitch.

8. A composition of matter comprising sulfur, a sulfurized pitch, and the reaction products of an alkaline polysulfide and additive compounds of olefins having the general formula $OC_nH_{2n}X_2$ where X is a negative radical, said composition having the property of becoming less viscous at elevated temperatures up to its decomposition temperature, a sufficient amount of elemental sulfur being present in the composition to cause the viscosity to increase at elevated temperatures in the absence of the pitch.

JOSEPH C. PATRICK.